(12) United States Patent
Sasaki

(10) Patent No.: US 6,469,824 B2
(45) Date of Patent: Oct. 22, 2002

(54) BI-DIRECTIONAL PUMPED OPTICAL FIBER AMPLIFIER WITH FAULT DETECTION MEANS AND NOVEL PUMP CONTROL

(75) Inventor: Akira Sasaki, Tokyo (JP)

(73) Assignee: Oki Electric Industry, Co., Ltd. (JP)

( * ) Notice: Subject to any disclaimer, the term of this patent is extended or adjusted under 35 U.S.C. 154(b) by 0 days.

(21) Appl. No.: 09/773,491

(22) Filed: Feb. 2, 2001

(65) Prior Publication Data

US 2001/0050806 A1 Dec. 13, 2001

(30) Foreign Application Priority Data

Jun. 13, 2000 (JP) ........................................ 2000-176832

(51) Int. Cl.[7] .............................. H01S 3/30; G02B 6/34; H04B 10/08
(52) U.S. Cl. ............. 359/341.44; 359/177; 359/341.43; 385/12
(58) Field of Search ..................... 359/341.44, 341.43, 359/341.2, 341.4; 370/242, 243

(56) References Cited

U.S. PATENT DOCUMENTS

| | | | | |
|---|---|---|---|---|
| 4,911,515 A | * | 3/1990 | So et al. ..................... 356/73.1 |
| 5,218,608 A | * | 6/1993 | Aoki ....................... 359/341.33 |
| 5,355,250 A | * | 10/1994 | Grasso et al. ........... 250/227.15 |
| 5,504,617 A | * | 4/1996 | Spirit ........................... 359/110 |
| 5,528,404 A | * | 6/1996 | MacKichan ................. 356/73.1 |
| 5,767,956 A | * | 6/1998 | Yoshida ...................... 356/73.1 |
| 5,903,375 A | * | 5/1999 | Horiuchi et al. ............ 359/130 |
| 5,963,362 A | * | 10/1999 | Fukaishi ...................... 359/137 |
| 5,995,274 A | * | 11/1999 | Sugaya et al. ............... 359/134 |
| 6,011,623 A | * | 1/2000 | MacDonald et al. ........ 356/519 |
| 6,222,668 B1 | * | 4/2001 | Dutrisac et al. ............. 359/110 |
| 6,301,036 B1 | * | 10/2001 | Spencer ....................... 359/110 |
| 6,317,255 B1 | * | 11/2001 | Fatehi et al. ................. 359/177 |

FOREIGN PATENT DOCUMENTS

EP 903875 A2 * 3/1999 ......... H04B/10/152

OTHER PUBLICATIONS

Sato et al. "OTDR in Optical Transmission Systems Using Er–Doped Fiber Amplifiers Containing Optical Circulators." Nov. 1991. IEEE Photonics Technology Letters. vol. 3 No. 11. pp. 1001–1003.*

* cited by examiner

Primary Examiner—Thomas H. Tarcza
Assistant Examiner—Stephen Cunningham
(74) Attorney, Agent, or Firm—Venable; James R. Burdett

(57) ABSTRACT

A low cost L-band EDF (erbium doped fiber) amplifier offering high safety for human beings. Signal light and forward pumping light enter from the front end of the EDF. Amplified signal light exits and backward pumping light enters from the rear end of the EDF. The signal light that exits the rear end of the EDF isoutput from an optical connector. The power of the output signal light is set to its normal value when an optical fiber is connected to the optical connector, but is reduced to a level safe for the human body when an optical fiber is not connected to the optical connector. When the output signal light power is reduced, the forward pumping light power is reduced to a prescribed value that is not zero, and the backward pumping light power is reduced to zero. Where the backward pumping light power is zero, the output signal light power depends solely on the forward pumping light power. Therefore, the output signal light power can be reduced to a safe level using a simple control circuit.

19 Claims, 3 Drawing Sheets

BI-DIRECTIONAL PUMPED OPTICAL FIBER AMPLIFIER WITH FAULT DETECTION MEANS AND NOVEL PUMP CONTROL

BACKGROUND OF THE INVENTION

1. Field of the Invention

The present invention relates to an optical fiber amplifier. The present invention may be applied in an optical communication system using the wavelength division multiplexing method.

2. Description of Related Art

An optical fiber amplifier is used in, for example, an optical communication system using the wavelength division multiplexing method. In the wavelength division multiplexing method, one wavelength is used as one communication channel, and light of multiple wavelengths is carried simultaneously in a single optical fiber. As a result, an optical fiber amplifier is constructed such that it can amplify light of multiple wavelengths simultaneously.

As such an optical fiber amplifier, an optical fiber amplifier that uses erbium doped optical fiber (EDF) is known in the art. In this amplifier, input signal light and pumping light are input to an EDF. The power of the signal light output from this amplifier is controlled by the power of the pumping light. As optical fiber amplifiers of this type, amplifiers that amplify light in the C-band wavelength region (1530–1565 nm) and those that amplify light in the L-band region (1570–1600 nm) are known.

The EDF used in a L-band amplifier has the same composition as the EDF used in an C-band amplifier, but a different total length. While the length of a C-band EDF is 20–30 meters, the length of an L-band EDF is 100–300 meters. Consequently, even where the total absorption loss for a C-band EDF is large, it is only around 80 dB (decibels), while the total for an L-band EDF comprises 200–600 dB.

In a C-band EDF, the relationship between the power of the pumping light and the power of the output signal light may be expressed as a linear function. In other words, the power of the output signal light depends solely on the power of the pumping light, and does not depend on other factors such as the power of the input signal light. For example, if the power of the pumping light is cut in half, the power of the output signal light is halved as well. On the other hand, with an L-band EDF, the relationship between the power of the pumping light and the power of the output signal light cannot be expressed as a linear function. In other words, the power of the output signal light depends not only on the power of the pumping light, but also on other factors such as the power of the input signal light. This difference in the characteristics of the C-band EDF and the L-band EDF is thought to be due to differences in the pumping mechanism and the length of each EDF. In a C-band EDF, pumping light is directly converted into C-band energy. In an L-band EDF, on the other hand, pumping light is first converted into C-band energy, and is then converted into L-band energy. The efficiency of the conversion of the energy from C-band to L-band energy changes dynamically depending on the power of the input signal light.

In an optical communication system, the output connector of the optical fiber amplifier is connected to optical fiber for communication. When the output connector is connected to the optical fiber, there is no danger of external leakage of the amplified light. However, the communication fiber is sometimes removed by the worker. When the communication fiber is removed even while the optical amplifier is operating, the output connector emits the amplified signal light to the outside. Generally, light amplified by the optical fiber amplifier is extremely powerful, and consequently there is a risk that the amplified light will have a harmful effect on the human body.

In order to protect the human body from the light output from the optical fiber amplifier, it is preferred that the connection/disconnection status of the output connector be automatically detected, the power of the output light be reduced to a level at which it will not be harmful to the human body if the optical fiber is disconnected, and the output power be restored to its normal level when the optical fiber is reconnected. This type of control is not difficult for a C-band amplifier, because in a C-band amplifier, the power of the output signal light has a linear relationship to the power of the pumping light, as described above. In other words, in a C-band amplifier, by simply reducing the power of the pumping light to a pre-set value, the power of the output light can be reduced to a level at which it is not harmful to people. Conversely, it is not easy to perform the above control in an L-band optical amplifier, because in an L-band optical amplifier, the power of the pumping light and the power of the output light do not have a linear relationship, as described above. In a conventional art pertaining to an L-band amplifier, in order to ensure human safety, complex processing using high-order functions is required. To carry out these complex processing, a microprocessor is necessary, which increases the cost of the L-band optical amplifier.

SUMMARY OF THE INVENTION

A object of the present invention is to provide an optical fiber amplifier that is very safe for human beings at low cost.

To achieve this object, the optical fiber amplifier pertaining to the present invention comprises: an optical fiber in which the signal light is amplified in response to the power of the pumping light; a front incident means that causes the signal light and the forward pumping light to enter the front end of the optical fiber; a rear incident means that causes the backward pumping light to enter the rear end of the optical fiber; an output means that outputs to the outside the signal light that exits the rear end of the optical fiber; and a control means that, when the output means is in a connected state, sets the power of the forward pumping light to a first prescribed value and sets the power of the backward pumping light to a second prescribed value, and when the output means is in a disconnected state, sets the power of the forward pumping light to a third prescribed value that is smaller than the first prescribed value but larger than zero, and sets the power of the backward pumping light to zero.

By setting the power of the backward pumping light to zero, the power of the signal light output from the output means is made to depend solely on the power of the forward pumping light. As a result, the power of the signal light output from the output means can be reduced to a level safe for human beings using a simple control process.

BRIEF DESCRIPTION OF THE DRAWINGS

Other objects and advantages of the present invention will be explained with reference to the accompanying drawings below.

DESCRIPTION OF THE PREFERRED EMBODIMENTS

Figure 1:
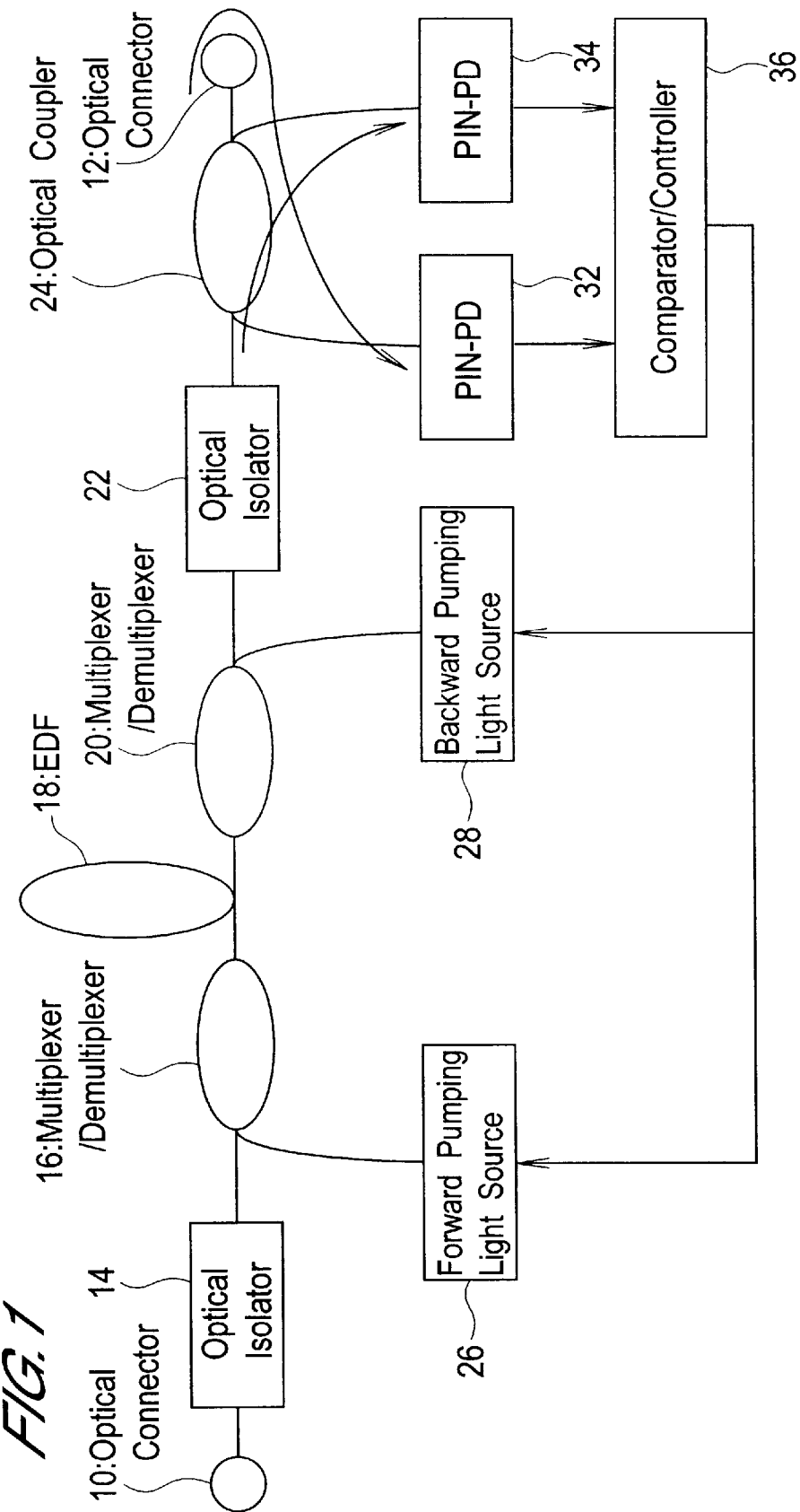
FIG. 1 is a drawing showing the general construction of the optical fiber amplifier pertaining to an embodiment of the present invention.

Embodiments of the present invention will be described below using the drawings. In the drawings, the sizes, configurations and positional relationships of the structural elements are only indicated in summary fashion in order to enable to the present invention to be understood. Moreover, the numerical conditions described below are merely examples.

FIG. 1 is a drawing showing the general construction of the optical fiber amplifier pertaining to an embodiment of the present invention.

As shown in FIG. 1, this optical fiber amplifier includes an input optical connector 10, an output optical connector 12, an optical isolator 14, an optical multiplexer/demultiplexer 16, an L-band erbium doped optical fiber (EDF) 18, an optical multiplexer/demultiplexer 20, an optical isolator 22, an optical coupler 24, a forward pumping light source 26, a backward pumping light source 28, pin photodiodes 32 and 34, and a comparator/controller 36.

The optical connectors 10 and 12 are each connected to an optical fiber not shown in the drawings. The input optical connector 10 inputs signal light from the optical fiber. The output optical connector 12 outputs signal light to the optical fiber.

The optical isolators 14 and 22 are elements that allow only light traveling in one direction to pass through and block light traveling in the other direction. The optical isolator 14 is located between the optical connector 10 and the optical multiplexer/demultiplexer 16. The optical isolator 22 is located between the optical multiplexer/demultiplexer 20 and the optical coupler 24. The optical isolator 14 allows signal light that enters from the side of the optical connector 10 to pass through, but blocks light entering from the side of the optical multiplexer/demultiplexer 16. Similarly, the optical isolator 22 allows signal light that enters from the side of the optical multiplexer/demultiplexer 20 to pass through, but blocks light entering from the side of the optical coupler 24. The optical isolators 14 and 22 are used in order to prevent oscillation of the EDF 18.

The optical multiplexer/demultiplexers 16 and 20 have the function to combine light of differing wavelengths and separate light into different wavelengths. The optical multiplexer/demultiplexer 16 is connected to the optical isolator 14, the EDF 18 and the forward pumping light source 26. The optical multiplexer/demultiplexer 20 is connected to the EDF 18, the optical isolator 22 and the backward pumping light source 28. The optical multiplexer/demultiplexer 16 combines the signal light input from the optical isolator 14 and the pumping light input from the forward pumping light source 26, and outputs the combined light to the EDF 18. The optical multiplexer/demultiplexer 20 separates the signal light from the light input from the EDF 18 and outputs it to the optical isolator 22. In addition, the optical multiplexer/demultiplexer 20 outputs the pumping light input from the backward pumping light source 28 to the EDF 18.

The EDF 18 is an optical amplification medium that amplifies light in the L-band wavelength range (1570–1600 nm). The EDF 18 is located between the optical multiplexer/demultiplexer 16 and the optical multiplexer/demultiplexer 20. The EDF 18 amplifies the signal light input from the optical multiplexer/demultiplexer 16 in accordance with the power of the pumping light input from the pumping light sources 26 and 28, and outputs the amplified signal light to the optical multiplexer/demultiplexer 20. As described above, the total absorption loss of the EDF 18 is 200 dB, for example.

The optical coupler 24 is an optical splitter. The optical coupler 24 splits off a part of the signal light transmitted from the optical isolator 22 to the optical connector 12 and transmits split light to the pin photodiode 34. In addition, the optical coupler 24 splits off the light that is reflected by the optical connector 12 and returns to the optical coupler 24, and transmits it to the pin photodiode 32.

The pumping light sources 26 and 28 are laser diodes used to provide pumping light to the EDF 18. The pumping light output by the pumping light sources 26 and 28 has a wavelength of 1480 nm, for example. The pumping light sources 26 and 28 are used in order to pump the EDF 18. The pumping light output from the forward pumping light source 26 is input to the EDF 18 from the front end via the optical multiplexer/demultiplexer 16. The pumping light output from the backward pumping light source 28 is input to the EDF 18 from the rear end via the optical multiplexer/demultiplexer 20. The power of the pumping light output by the pumping light sources 26 and 28 is controlled by the comparator/controller 36.

The pin photodiode 32 receives from the optical coupler 24 the light that is reflected by the optical connector 12 and returns to the optical coupler 24, and outputs a current having a value corresponding to the received light energy.

The pin photodiode 34 receives from the optical coupler 24 a part of the signal light that is transmitted from the optical isolator 22 to the optical connector 12, and outputs a current having a value corresponding to the received light energy.

The comparator/controller 36 converts the current input from the pin photodiodes 32 and 34 into voltage signals. Voltage attenuation from resistors, for example, are used for this conversion. By setting the resistance of these resistors to appropriate values respectively, the ratio of these voltage signals are made to correspond to the ratio of the power of the light transmitted to the optical connector 12 and the power of the light reflected by the optical connector 12, that is, the reflectance of the optical connector 12. The comparator/controller 36 calculates the reflectance Vj of the optical connector 12 using these voltage signals. This calculation may be performed by a single division circuit. As described below, the reflectance Vj is essentially zero when the optical fiber is connected to the optical connector 12, but becomes large when the optical fiber is not connected. The comparator/controller 36 determines the connection state of the optical connector 12 based on the comparison of the reflectance rate Vj with a prescribed threshold value. When the optical connector 12 is connected, the comparator/controller 36 sets the power of the light output from the pumping light sources 26 and 28 to their normal values. The power of the light output from the pumping light sources 26 and 28 may have the same value or different values. Where the optical connector 12 is not connected, on the other hand, the comparator/controller 36 reduces the power of the light output from the pumping light sources 26 to a prescribed value that is not zero (for example, a value that is one-fifth of the value output when the optical connector 12 is connected), and sets the power of the light output by the backward pumping light source 28 to zero. Furthermore, when the optical connector 12 is reconnected, the comparator/controller 36 returns the power of the light output by the pumping light sources 26 and 28 to their normal values.

The principle of the optical fiber amplifier shown in FIG. 1 is explained below.

First, the reason that the connection/disconnection state of the optical connector 12 can be detected from the reflectance Vj will be explained.

When the optical connector 12 is connected to an optical fiber, the end surface of the optical connector 12 is directly connected to the fiber, but when the connector is disconnected, it is exposed to the air. Here, the refractive indices of the optical connector 12 and the optical fiber are essentially identical, but there is a huge difference in the refractive indices of the optical connector 12 and open air. As a result, while the reflectance of the optical signals in the connection surface between the optical connector 12 and the optical fiber is essentially zero, the reflectance of the optical signals in the connection surface between the optical connector 12 and open air is large. Therefore, the reflectance Vj is essentially zero when the optical connector 12 is connected to the optical fiber, but becomes large when the optical connector 12 is disconnected.

Next, the reason that, when the optical connector 12 is disconnected, the power of the light output from the forward pumping light source 26 is reduced to a value that is not zero, while the power of the light that is output from the backward pumping light source 28 is set to zero, will be explained.

Figure 2:
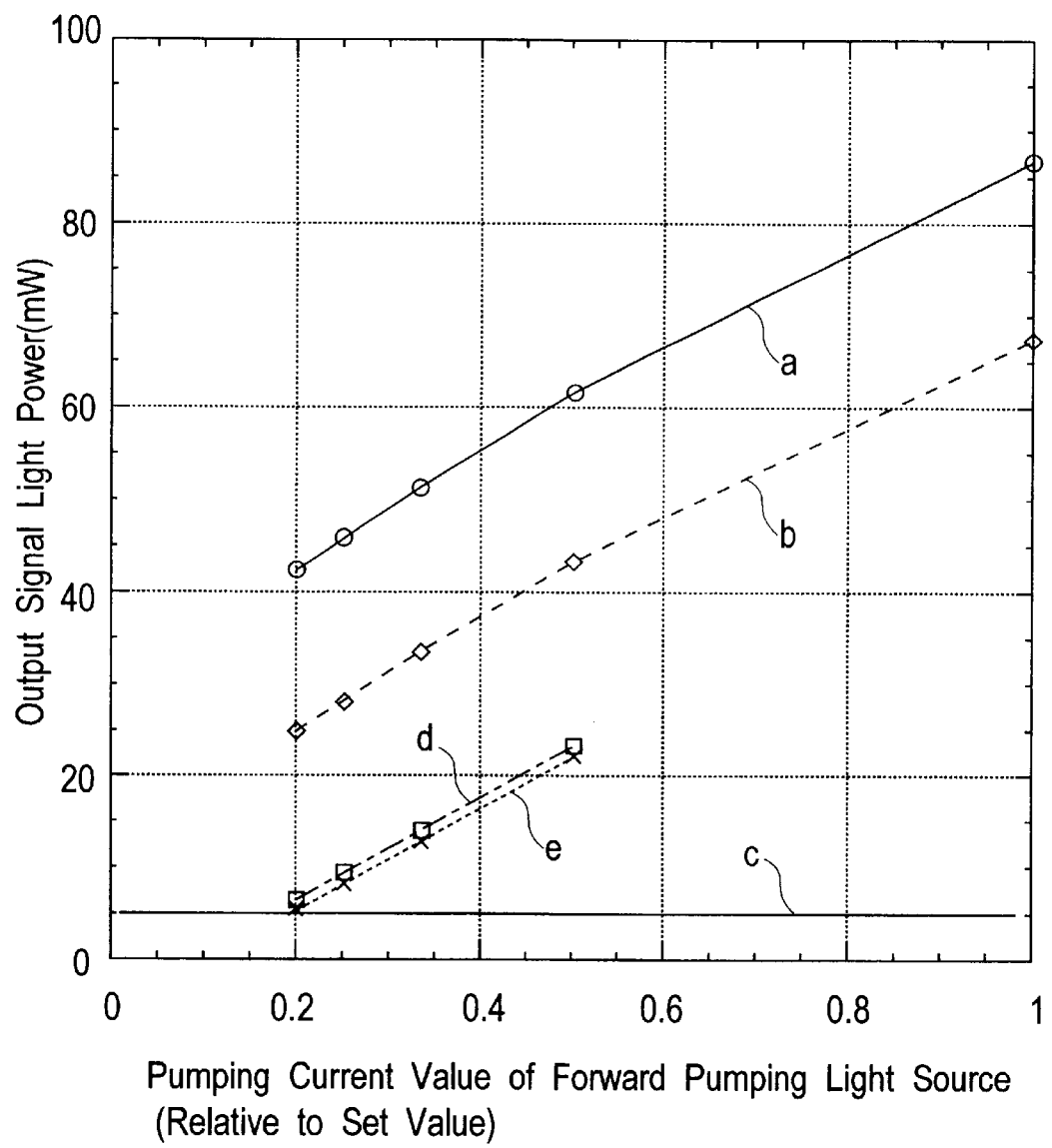
FIG. 2 is a general flowchart to explain the output power control method used by the optical fiber amplifier pertaining to an embodiment of the present invention.

FIG. 2 is a graph showing a characteristic of the optical fiber amplifier shown in FIG. 1. The horizontal axis in FIG. 2 is the standard level of the pumping current supplied from the comparator/controller 36 to the forward pumping light source 26, and the injection current when the optical connector 12 is connected is set to '1'. The pumping injection current is proportional to the power of the pumping light output from the forward pumping light source 26. The vertical axis in FIG. 2 is the power of the signal light output from the EDF 18. In FIG. 2, the curved line a represents the characteristic when the input signal light power is −3.6 dBm/channel and the power of the output from the backward pumping light source 28 is 80 milliwatts. The curved line b represents the characteristic when the input signal light power is −4.6 dBm/channel and the power of the output from the backward pumping light source 28 is 40 milliwatts. The straight line c represents the output signal light power that is safe for humans (in this example, 5 milliwatts). The curved line d represents the characteristic when the input signal light power is −3.6 dBm/channel and the power of the output from the backward pumping light source 28 is 0 milliwatts. The curved line e represents the characteristic when the input signal light power is −4.6 dBm/channel and the power of the output from the backward pumping light source 28 is 0 milliwatts. Here, dBm/channel indicates the light power per channel, i.e., the light power for one wavelength.

As shown in FIG. 2, the output signal power changes depending on the power of the forward pumping light, and also changes depending on the power of the backward pumping light and of the input signal light. However, where the power of the backward pumping light is 0 milliwatts, the power of the output signal light is for the most part unrelated to the power of the input signal light (see curves d and e in FIG. 2). Therefore, where the power of the backward pumping light is 0 milliwatts, the power of the output signal light essentially depends solely on the power of the forward pumping light. In other words, where the power of the backward pumping light is 0 milliwatts, power of the output signal light and the power of the forward pumping light can be expressed through a linear function. In addition, in this case, if the injection current (standard level) of the forward pumping light source 26 is set to 0.2 or lower, i.e., to one-fifth of the level when the optical connector 12 is connected, the power of the output signal light can be made 5 milliwatts or lower.

Therefore, it is acceptable if, when the optical connector 12 is not connected, the comparator/controller 36 performs only control to set the output from the backward pumping light source 28 to zero and control to set the current supplied to the forward pumping light source 26 to one-fifth of the level supplied when the optical connector 12 is connected, for example.

A second method to reduce the power of the output signal light using a simple control process involves setting the power output from both the pumping light source 26 and the pumping light source 28 to zero. However, when this method is used, it is difficult to detect that the optical connector 12 has returned to the connected state, for the reason described below.

In the explanation below, the input signal light is deemed 0 dBm, and the signal light amplified in the EDF 18 is deemed 20 dBm. Moreover, the explanation below assumes a case in which, when the power of the signal light reflected by the optical connector 12 becomes 5 dBm, i.e., when the Fresnel reflection reaches −15 dB, the power of the output from the pumping light sources 26 and 28 is set to zero.

When the optical connector 12 is in a disconnected state, the power of the reflected light which returns to the optical connector 12 becomes 5 dBm. In the case that the comparator/controller 36 sets the power of the light output from the pumping light sources 26 and 28 to zero when the optical connector 12 is in a disconnected state, the EDF 18 suspends amplification of the input optical signal. When amplification is suspended, the power of the output optical signal falls below the power of the input optical signal, for example to −20 dBm, due to the attenuation effect of the EDF 18. Where the output signal light power is −20 dBm and the Fresnel reflection is −15 dBm, the power of the reflected light which returns to the optical connector 12 becomes −35 dBm. Furthermore, if the optical fiber is connected to the optical connector 12 in this state, because the reflected light essentially disappears, the power of the light input by the pin photodiode 32 falls by another 5 dB and becomes −40 dBm.

In this way, using the method in which the power of the light output from both pumping light source 26 and pumping light source 28 is set to zero, the power of the light received by the pin photodiode 32 changes from +5 dBm to −40 dBm. In other words, a 45 dB monitoring dynamic range is demanded of the pin photodiode 32. However, the input dynamic range for a normal pin photodiode is approximately 40 dB. Consequently, in this method it cannot be detected that the optical connector 12 has returned to the connected state, and as a result, the power of the signal light output by the optical fiber amplifier cannot be returned to its original amount.

By contrast, if a control circuit to effectively expand the dynamic range is included, the return of the optical connector 12 to the connected state can be detected. However, adding such a control circuit increases the cost of the optical fiber amplifier.

A third method to reduce the power of the output signal light using a simple control process involves reducing the power of the output from the backward pumping light source 28 to a prescribed level that is not zero and setting the power of the output from the forward pumping light source 28 to zero. However, this method, i.e., the method in which only backward pumping light is used for pumping, has a much smaller output signal light power than the method in which only the forward pumping light is used for pumping. Therefore, for the same reason as in the second method, in a normal pin photodiode, the input dynamic range is too small and the change from the disconnected state to the connected state cannot be detected. The reason that the output signal light power differs depending on whether only forward pumping light or only backward pumping light is used is explained below.

Where only backward pumping light source is driven, the power of the pumping light falls as it approaches the input side of the EDF 18. As a result, the input signal light receives almost no amplification effect near the input side of the EDF 18, and any such effect is outweighed by the loss due to the absorption effect of the EDF 18. Therefore, when the optical signal reaches the area near the output side of the EDF 18, i.e., the area in which the amplification effect is larger than the light absorption effect, the power of the optical signal is extremely small. Consequently, the power of the output signal light after amplification does not becomes very large either. Because an L-band optical fiber amplifier uses an extremely long EDF, the amount of attenuation of the optical signal due to the light absorption effect is extremely large, and consequently it is difficult to amplify the optical signal to a level sufficient to enable detection of the change from a disconnected state to a connected state.

On the other hand, the optical fiber amplifier of the present invention, i.e., the optical fiber amplifier that uses only the forward pumping light for pumping, amplifies the optical signal near the input side of the EDF 18. The power of the forward pumping light falls as it approaches the output side of the EDF 18. However, if the signal light power is increased to some degree due to amplification near the input side, there is no significant attenuation of the optical signal power near the output side, because where the signal light power is enough high, the self-pumping phenomenon occurs in the EDF 18, i.e., a phenomenon occurs in which the signal light itself pumps the EDF 18. Consequently, with the optical fiber amplifier of the present invention, the optical signal can be easily amplified to a level sufficient to enable detection of the change from a disconnected state to a connected state. Research by the inventors has revealed that where the optical fiber amplifier of the present invention is used, the monitoring dynamic range of the pin photodiode 32 is 10 dB or less.

Figure 3:
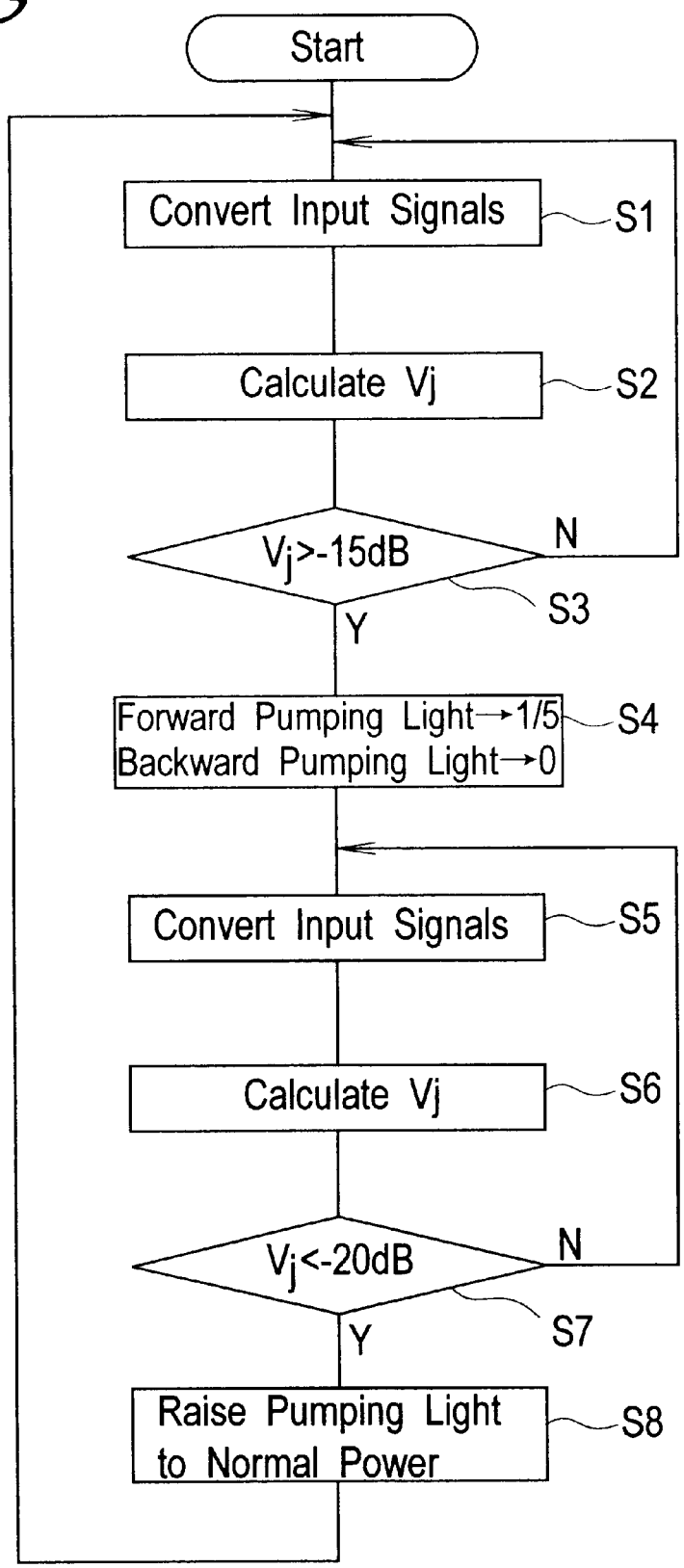
FIG. 3 is a graph to explain a characteristic of the optical fiber amplifier pertaining to an embodiment of the present invention.

The overall operation of the optical fiber amplifier pertaining to this embodiment will now be explained with reference to FIG. 1 and FIG. 3. FIG. 3 is a general flowchart to explain the operation of the comparator/controller 36.

The optical connector 10 inputs signal light from an optical fiber not shown in the drawing. This signal light passes through the optical isolator 14 and reaches the optical multiplexer/demultiplexer 16. The optical multiplexer/demultiplexer 16 combines the signal light input from the optical isolator 14 and the pumping light input from the forward pumping light source 26, and transmits the combined light to the front end of the EDF 18. At the same time, the optical multiplexer/demultiplexer 20 transmits the pumping light input from the backward pumping light source 28 to the rear end of the EDF 18. The EDF 18 is pumped by the pumping light input from the front end and the rear end, and as a result the signal light input from the front end is amplified. The power of the amplified signal light changes depending on the power of the pumping light output from the pumping light sources 26 and 28. As described below, when the optical connector 12 is connected to the optical fiber, the power of the pumping light output from the pumping light source 26 is equal to the power of the pumping light output from the pumping light source 28. On the other hand, when the optical connector 12 is disconnected, the power of the pumping light output from the pumping light source 26 is smaller than it was when the optical connector 12 was connected to the optical fiber (being about one-fifth of the value output when the optical connector 12 is connected, for example), and the output from the pumping light source 28 is stopped.

The signal light amplified in the EDF 18 passes through the optical multiplexer/demultiplexer 20 and the optical isolator 22 and reaches the optical coupler 24. As described above, the optical coupler 24 splits off a part of this signal light and transmits it to the pin photodiode 34, and transmits the remaining signal light to the optical connector 12. In addition, the optical coupler 24 separates the signal light that was reflected and returned by the optical connector 12, and transmits this reflected signal light to the pin photodiode 32. As described above, the pin photodiodes 32 and 34 convert received light into current signals. These current signals are input to the comparator/controller 36.

The comparator/controller 36 uses the input current signals to control the power of the output from the pumping light sources 26 and 28.

The comparator/controller 36 converts the current signal input from the pin photodiode 32 into a voltage value Vr and converts the current signal input from the pin photodiode 34 into a voltage value Vo (see step S1 in FIG. 3). The comparator/controller 36 then calculates the ratio of these voltages, i.e., Vr/Vo (see step S2 in FIG. 3). This ratio becomes reflectance Vj.

The comparator/controller 36 then compares the reflectance Vj with a first threshold value (see step S3 in FIG. 3). In this embodiment, one example of the first threshold value is −15 dB. When the reflectance Vj is larger than the first threshold value, the comparator/controller 36 determines that the optical connector 12 is in a disconnected state, and otherwise determines that the optical connector 12 is connected to the optical fiber.

Where Vj≦−15 dB in Step S3, the comparator/controller 36 repeats steps S1 through S3.

On the other hand, where Vj>−15 dB in step S3, the comparator/controller 36 reduces the output from the forward pumping light source 26 and stops the output from the backward pumping light source 28 (see step S4 in FIG. 3). In this embodiment, as one example, the output from the forward pumping light source 26 when the optical connector 12 is in a disconnected state is set to one-fifth of the output when the optical connector 12 is in a connected state.

The comparator/controller 36 then inputs the current signals from the pin photodiodes 32 and 34 once more, and converts these current signals into voltage values Vr and Vo (see step S5 in FIG. 3). The comparator/controller 36 then calculates the reflectance Vj, i.e., the ratio Vr/Vo (see step S6 in FIG. 3).

The comparator/controller 36 next compares the reflectance Vj with a second threshold value (see step S7 in FIG. 3). In this embodiment, one example of the second threshold value is −20 dB. Where Vj≧−20 dB, the comparator/ controller 36 determines that the optical connector 12 is in a disconnected state, and repeats steps S5 through S7. Where Vj<—20 dB, on the other hand, the comparator/controller 36 determines that the optical connector 12 is connected to the optical fiber, and raises the power of the output from the pumping light sources 26 and 28 to their original values.

In the example of the operation of this embodiment used in FIG. 3, the first threshold value, i.e., the threshold value used to determine the change from the connected state to the disconnected state, was deemed —15 dB, and the second threshold value, i.e., the threshold value used to determine the change from the disconnected state to the connected state, was deemed −20 dB. These values were adopted as a measure to deal with the situation in which the measured value of the reflectance Vj fluctuates. Where the threshold value used to determine the change from the connected state to the disconnected state is the same as the threshold value used to determine the change from the disconnected state to the connected state, there is a high risk that the connection state of the optical connector 12 will be erroneously determined, due to the fluctuation of the measured value of the reflectance Vj. Such an erroneous determination causes the output signal light power to increase even through the optical connector 12 is in a disconnected state, which results in a loss of worker safety. On the other hand, if the threshold value is shifted to the low reflectance side in order to increase safety, the output signal light power can easily become small even when the optical connector 12 is in a connected state, making operation of the optical fiber amplifier unstable. By contrast, this problem is resolved in this embodiment through the use of two types of threshold values, i.e., the above first threshold value and second threshold value. By setting the second threshold value to a smaller reflectance value than the first threshold value, an optical fiber amplifier that is safer for human beings and more stable in operation may be obtained.

What is claimed is:

1. An optical fiber amplifier comprising:
   an optical fiber in which a signal light is amplified in response to the power of a pumping light;
   a front incident means that causes said signal light and a forward pumping light to enter on a front end of said optical fiber;
   a rear incident means that causes a backward pumping light to enter a rear end of said optical fiber;
   output means that output said signal light that exits the rear end of said optical fiber; and
   control means that, when said output means is in a connected state, sets the power of said forward pumping light to a first prescribed value and sets the power of said backward pumping light to a second prescribed value, and when said output means is in a disconnected state, sets the power of said forward pumping light to a third prescribed value that is smaller than said first prescribed value but larger than zero, and sets the power of said backward pumping light to zero.

2. The optical fiber amplifier according to claim 1, wherein said optical fiber is erbium doped optical fiber.

3. The optical fiber amplifier according to claim 2, wherein said optical fiber is constructed such that light having a wavelength of 1570–1600 nanometers is amplified.

4. The optical fiber amplifier according to claim 1, wherein said front incident means comprises a multiplexer that multiplexes said signal light and said forward pumping light and causes the multiplexed light to strike said front end of said optical fiber.

5. The optical fiber amplifier according to claim 1, wherein said rear incident means comprises a multiplexer that allows said signal light that exits said rear end of said optical fiber to pass through and causes said backward pumping light to strike said rear end of said optical fiber.

6. The optical fiber amplifier according to claim 1, wherein said output means is an optical connector connected to an optical transmission line.

7. The optical fiber amplifier according to claim 1, wherein said control means comprises means to detect the connection/disconnection state of said output means using a reflectance value of said signal light.

8. The optical fiber amplifier according to claim 7, wherein said detection means comprises an optical coupler that extracts a part of said signal light that exits said rear end of said optical fiber and extracts a part or all of said signal light reflected by said output means.

9. The optical fiber amplifier according to claim 8, wherein said detection means includes a first photoelectric conversion element that performs photoelectric conversion of said reflected light received from said optical coupler, and a second photoelectric conversion element that performs photoelectric conversion of said exiting light received from said optical coupler.

10. The optical fiber amplifier according to claim 9, wherein said control means comprises a first conversion means that converts the output current from said first photoelectric conversion means into a first voltage signal, and second conversion means that converts the output current from said second photoelectric conversion means into a second voltage signal.

11. The optical fiber amplifier according to claim 10, wherein said first and second photoelectric conversion elements are pin photodiodes.

12. The optical fiber amplifier according to claim 10, wherein said control means comprises a divider that obtains said reflectance value by calculating the ratio of said first voltage signal to said second voltage signal.

13. The optical fiber amplifier according to claim 10, wherein a ratio of the power of the light received by said first photoelectric conversion element when said output means is in a connected state to the power of the light received by said first photoelectric conversion element when said output means is in a disconnected state is 40 dB or less.

14. The optical fiber amplifier according to claim 7, wherein said detection means is means that detects the connection/disconnection state of said output means by comparing said reflectance value with prescribed threshold values.

15. The optical fiber amplifier according to claim 14, wherein said threshold values include a first threshold value used to detect a change from said connected state to said disconnected state and a second threshold value used to detect a change from said disconnected state to said connected state.

16. The optical fiber amplifier according to claim 1, wherein said optical fiber amplifier comprises an input optical connector used to receive from the outside said signal light that strikes said front incident means.

17. The optical fiber amplifier according to claim 1, further comprising a light source that generates said forward pumping light in accordance with a current value input from said control means.

18. The optical fiber amplifier according to claim 1, further comprising a light source that generates said backward pumping light in accordance with a current value input from said control means.

19. The optical fiber amplifier according to claim 1, further comprising a first optical isolator that blocks the light exiting said front end of said optical fiber and a second optical isolator that blocks the light entering said optical amplifier by the output means and propagating in the direction from rear end to front end of the optical fiber.

* * * * *